US006913410B2

(12) United States Patent
Blanke (10) Patent No.: US 6,913,410 B2
(45) Date of Patent: Jul. 5, 2005

(54) BALL JOINT (75) Inventor: Arnold Blanke, Damme (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 94 days.

(21) Appl. No.: 10/333,281

(22) PCT Filed: May 22, 2002

(86) PCT No.: PCT/DE02/01880

§ 371 (c)(1),
(2), (4) Date: Jan. 16, 2003

(87) PCT Pub. No.: WO02/095248

PCT Pub. Date: Nov. 28, 2002

(65) Prior Publication Data

US 2004/0042846 A1 Mar. 4, 2004

(30) Foreign Application Priority Data

May 22, 2001 (DE) .......................................... 101 25 143

(51) Int. Cl.[7] .............................................. F16C 11/00
(52) U.S. Cl. ...................................... 403/141; 403/143
(58) Field of Search ................................ 403/141–143

(56) References Cited

U.S. PATENT DOCUMENTS

| 3,801,169 A | | 4/1974 | Mullen | |
|---|---|---|---|---|
| 4,069,864 A | * | 1/1978 | Novoryta et al. | ....... 403/143 X |
| 4,076,343 A | | 2/1978 | McCloskey | |
| 4,704,043 A | * | 11/1987 | Hackman et al. | ............. 403/56 |
| 5,799,968 A | * | 9/1998 | Loeffler | .................. 403/143 X |
| 6,206,785 B1 | * | 3/2001 | Thomas | .................. 403/141 X |
| 6,761,499 B2 | * | 7/2004 | Bohne et al. | ........... 403/141 X |

FOREIGN PATENT DOCUMENTS

| DE | 19 84 453 | | 4/1968 |
|---|---|---|---|
| DE | 33 41 878 | A1 | 5/1985 |
| DE | 44 20 478 | C1 | 6/1995 |
| DE | 44 21 403 | A1 | 12/1995 |
| DE | 100 23 602 | A1 | 11/2001 |
| EP | 0 589 550 | A1 | 3/1994 |
| FR | 2 378 197 | | 8/1978 |

* cited by examiner

Primary Examiner—John R. Cottingham
(74) Attorney, Agent, or Firm—McGlew and Tuttle, P.C.

(57) ABSTRACT

A ball-and-socket joint (1) is provided with a sleeve (2) or a pivot (3) with a partial spherical surface (4) and with a bearing shell (5) surrounding the partial spherical surface (4) in a positive-locking manner with a hollow spherical bearing surface (6). The bearing surface (6) is arranged in a two-part housing (9, 10), whose housing halves (9, 10) have locking elements (15, 16) with detents (17) and locking grooves (18) mutually engaging one another, which lock the two housing halves (9, 10) with one another in a relatively immovable manner in the direction of the longitudinal axis (13) of the sleeve (2) or of the pivot (3) in their final assembled position. The bearing surface (6) for the partial spherical surface (4) of the sleeve (2) or of the pivot (3) is integrated in the inner surfaces of the two housing halves (9, 10) and these (9, 10) are surrounded on their outer surfaces (11, 12) by a metallic ring element (8) in a positive-locking manner.

20 Claims, 7 Drawing Sheets

BALL JOINT

FIELD OF THE INVENTION

The present invention pertains to a ball-and-socket joint, comprising a sleeve or a pivot with a partial spherical surface and a bearing shell surrounding the said partial spherical surface in a positive-locking manner with a hollow spherical bearing surface, which is arranged in a two-part housing, whose housing halves have snap-in elements with detents and locking grooves mutually engaging each other, which lock the two housing halves in the direction of the longitudinal axis of the sleeve or pivot immovably in relation to one another in their final assembled position.

BACKGROUND OF THE INVENTION

In an older suggestion of this type according to DE 100 23 602 A1, the bearing shell is designed as a separate component and is clamped between the two housing halves. The bearing shell has an at least two-part design and must be fitted in correspondingly accurately for the correctly fitting seating of the partial spherical surface of a sleeve and the hollow spherical bearing shell and it also must be clamped in without clearance on its outer surface in both housing halves. This requires not only a precision manufacture for correct fit in quantity production, but also at least four parts, namely, two housing halves and the two bearing shells, which must be exactly coordinated with the partial spherical surfaces of the sleeve or the pivot.

In a ball-and-socket joint of another type according to DE 19 84 453 U1, a ring with a partial spherical surface is clamped on a bolt between two mirror-symmetrical support pieces, and a divided outer ring with a partial hollow spherical surface is clamped on the said partial spherical surface in an elastic bush, which is mounted between two snap rings within an opening of a transversal swinging arm. The bolt is arranged between two flanges of a chassis and is secured by means of a washer, a castellated nut and a cotter pin at the end facing away from the bolt head. The drawback is a large number of parts, which are to be exactly coordinated with one another and make not only the quantity production, but also the assembly of the ball-and-socket joint complicated.

SUMMARY OF THE INVENTION

Based on this state of the art, the basic object of the present invention is to simplify a ball-and-socket joint of the type mentioned in the introduction in terms of the assembly and production technology and to guarantee a correctly fitting seating with weak frictional forces of the ball-and-socket joint by the force- or displacement-controlled positioning of the two housing halves during their assembly.

This object is accomplished according to the present invention in conjunction with the generic features described in the introduction by the bearing surface for the partial spherical surface of the sleeve or of the pivot being integrated in the inner surfaces of both housing halves.

It becomes possible due to this design, the force-controlled or displacement-controlled pressing together of the two housing halves, to press together the locking elements during their assembly with their mutually engaging detents and locking grooves to the extent that the correctly fitting seating is obtained between the partial spherical surface of the sleeve and of the pivot, on the one hand, and the hollow spherical bearing surface of the bearing shells extending over one other in a positive-locking manner.

According to an advantageous embodiment of the present invention, the housing halves are extended over on their outer surface by a metallic ring element in a positive-locking manner. The preferably metallic ring element extending over the two housing halves preferably also acts as a displacement limitation during the pressing together of the two housing halves during the assembly. The ring element belongs to a first component, which is coupled in an articulated manner with a second component that is to be connected to the sleeve or to the pivot via the ball-and-socket joint. The ring element may also be made of other suitable materials, e.g., plastic or composites of metal and plastic instead of from the above-mentioned metallic materials.

According to an especially advantageous embodiment of the present invention, a gap extending approximately in parallel to the longitudinal symmetry axis of the sleeve or of the pivot is provided between the housing inner parts containing the bearing surfaces and the housing outer parts having the contact surfaces for the ring element. It is possible due to this gap to enable the housing inner parts having the bearing surfaces to elastically recede to the outside into the gap during the pressing together. The housing inner parts with their bearing surfaces are advantageously in contact with the partial spherical surface of the sleeve or of the pivot in the locked assembled position under a desired spring pretension. The spring pretension can be controlled by means of the ring-shaped, leaf spring-like receding bearing surfaces on the basis of the depth of snapping in of the locking elements of the two housing halves. This ball-and-socket joint makes it possible to lock the two housing halves with one another in relation to the partial spherical surface such that either a clearance-free ball-and-socket joint or a ball-and-socket joint that is subject to friction is created, which will grind itself in automatically to correctly fit after a certain number of movements of the joint. At any rate, this arrangement according to the present invention eliminates the possibility of a ball-and-socket joint tending to have an undesired clearance and consequently undesired tilting movements as well as of a ball-and-socket joint that is subject to strong frictional forces.

Finally, this ball-and-socket joint requires only two parts, because the hollow spherical bearing surface is integrated within the two housing halves. Not only simple manufacture, but also a likewise simple and rapid as well as reliable assembly is guaranteed as a result.

The housing outer parts of the two housing halves advantageously engage one another with their cylindrical locking elements during the assembly, wherein the cylindrical locking element of one housing half, which faces the ball head, is alternatingly provided with detents and locking grooves on its cylindrical outer surface, and the cylindrical inner surfaces of the cylindrical locking element of the other housing half, which extends over it, is provided with corresponding locking grooves and detents, which engage each other in a barb-like manner. Since the two locking elements with their cylindrical outer surfaces are in contact with the metallic ring element in a correctly fitting manner and are surrounded by same, it is no longer possible to loosen the locked connection without destruction.

It is obvious that the cylindrical surfaces of the locking elements may alternatively also be provided with locking tongues, as is shown in FIGS. 1 and 3 of the older suggestion DE 100 23 602 A1.

Finally, any spring pretension of the two housing inner parts in relation to their bearing surfaces brings about an increase in the locking forces of the locking element, which are pressed as a result against the metallic ring element, thus increasing the pressure.

To keep penetrating contaminants and consequently undesired frictions that may be associated therewith away from the ball-and-socket joint, both housing halves are provided with an annular ring each at their ends and are sealed against the sleeve or the pivot via an entropy-elastic ring sleeve extending over the said annular bead.

The ring sleeves may be fastened to the housing halves either indirectly or directly under elastic pretension or may be connected thereto by a connection in substance. For example, a two-component injection molding method may be used as a connection in substance. A one-part design of the ring sleeve and the housing half is also within the scope of the idea of the present invention.

While the sleeve or the pivot consists of a proven metal alloy, the housing halves are made of a wear- and heat-resistant plastic, e.g., polyether imide, polyamide, polyoxymethylene or polyether ether ketone.

The above-described ball-and-socket joint can be used especially advantageously on a rocker pendulum, on a tie rod or a transversal swinging arm of a motor vehicle.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings in particular, parts having the same function are designated with the same reference numbers in all figures.

Figure 1:
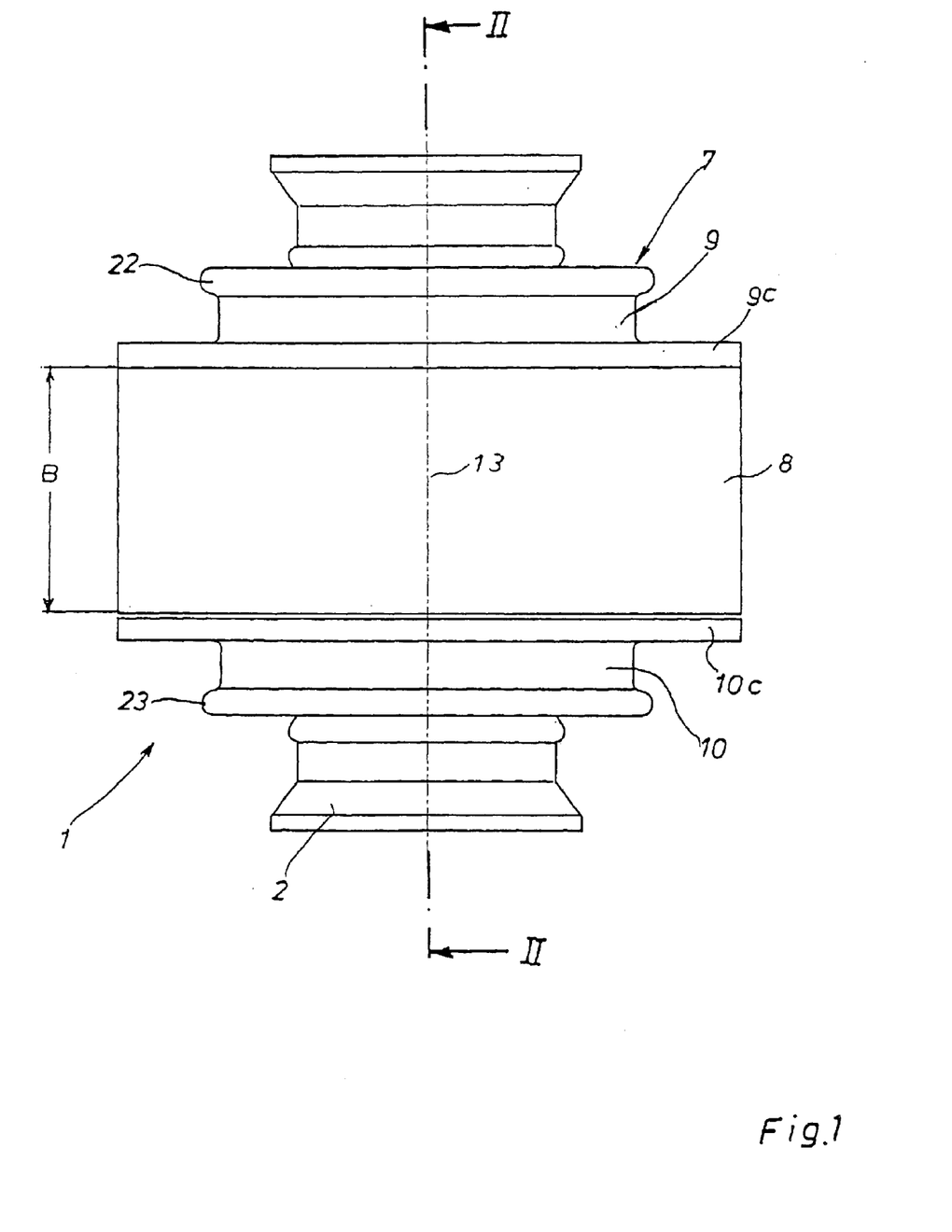
FIG. 1 is a view of a first embodiment of a ball-and-socket joint in conjunction with a sleeve.
Figures 2, 3:
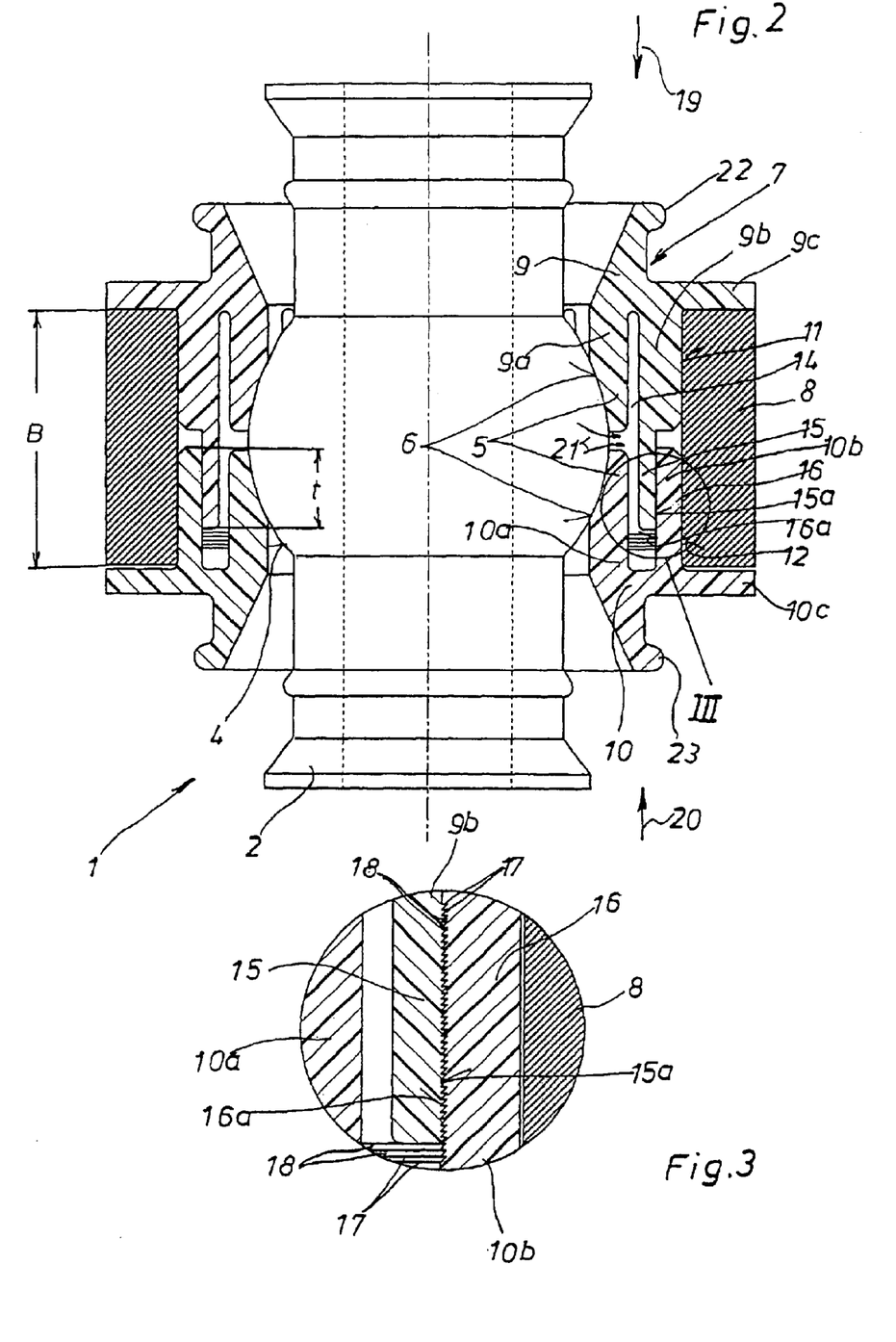
FIG. 2 is a sectional view along line II—II in FIG. 1.
FIG. 3 is the enlarged detail III from FIG. 2.

In the first embodiment according to FIGS. 1 through 3, the ball-and-socket joint 1 comprises a sleeve 2 with a partial spherical surface 4 and a bearing shell 5 surrounding the partial spherical surface 4 in a positive-locking manner with hollow spherical bearing surfaces 6, which are arranged in a common housing 7. The housing 7 is formed by the two housing halves 9, 10, which are surrounded on the outer surfaces 11, 12 by a metallic ring 8 in a positive-locking manner. This ring 8 belongs to a first component, not shown, which is coupled in an articulated manner via the ball-and-socket joint 1 with a second component, which is to be connected to the sleeve 2 and is likewise not shown.

The hollow spherical bearing surface 6 of the partial spherical surface 4 is integrated in the housing inner parts 9a, 10a of the two housing halves 9, 10.

As is apparent from FIG. 2 in conjunction with FIG. 3, a gap 14 extending approximately in parallel to the longitudinal symmetry axis 13 of the sleeve 2 is provided between these housing inner parts 9a, 10a containing the bearing surfaces 6 on the housing outer parts 9b, 10b of the two housing halves 9, 10, which said housing outer parts 9b, 10b have the contact surfaces 11, 12 for the ring element 8. Cylindrical locking elements 15, 16, which mutually extend over each other, are arranged at both housing outer parts 9b, 10b. Of these, the cylindrical locking element 15 of the housing half 9 facing the ball head 4 is provided alternatingly with detents 17 and locking grooves 18 on its cylindrical outer surface 15a, while the cylindrical inner surface 16a of the locking element 16 of the second housing part 10 is provided with corresponding locking grooves 18 and detents 17, which engage one another in a barb-like manner, as is apparent from FIG. 3.

As can be determined from FIG. 2, each housing half 9, 10 has a ring flange 9c, 10c each, which is in contact by one lateral surface with the ring element 8, whose width B determines the snap-in depth t of the two cylindrical locking elements 15, 16. This snap-in depth t is selected in conjunction with the width B of the ring element 8 such that the housing inner parts 9a, 10a are in contact by their bearing surfaces 6 with the partial spherical surface 4 of the sleeve 2 or of the pivot 3 under a certain spring pretension in the locked assembled position (see FIGS. 7 through 9). The amount of this spring pretension can be controlled by selecting the snap-in depth t of the cylindrical locking elements 15, 16. When the two housing parts 9, 10 are pushed on one another in the direction of the arrows 19, 20, the housing inner parts 9a, 10a elastically move outwardly in the direction of the arrows 21 after coming into contact with the partial spherical surface 4 until the desired snap-in depth t with the desired spring pretension is reached.

The snap-in depth t can be reached in both a displacement-controlled manner and a force-controlled manner, e.g., with the force that is necessary to lock the housing parts 9, 10 with one another in the direction of the arrows 19, 20.

Figure 4:
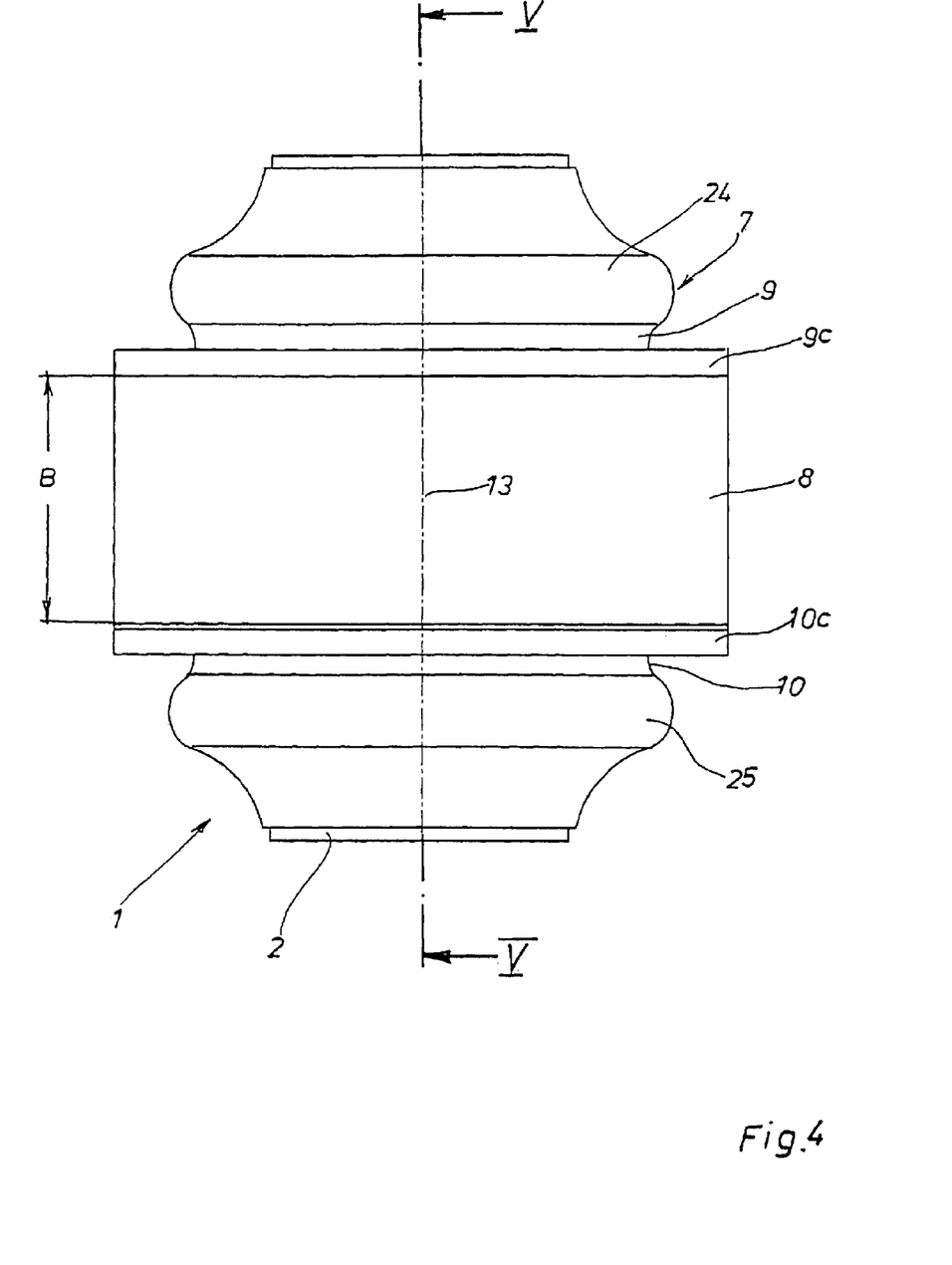
FIG. 4 is a view of a second embodiment of a ball-and-socket joint in conjunction with a sleeve, which is sealed at both ends by means of an entropy-elastic ring sleeve against the two housing halves.
Figure 5:
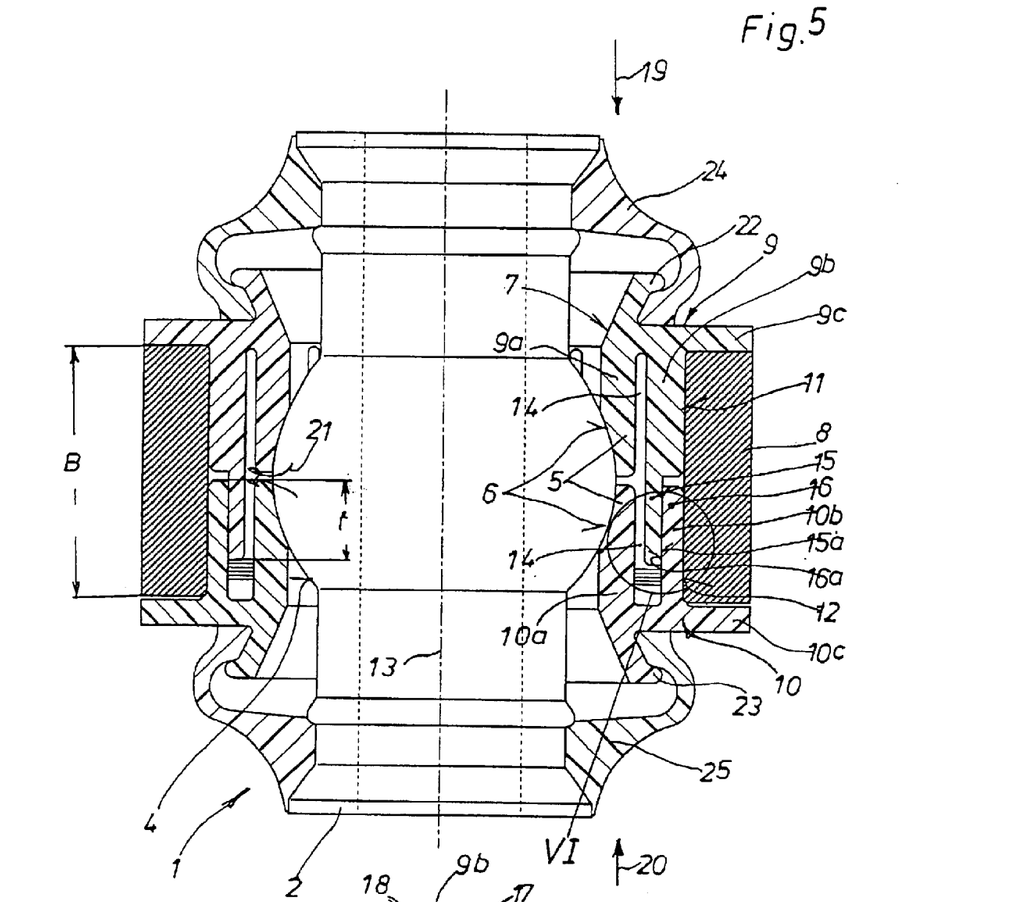
FIG. 5 is a sectional view along line V—V in FIG. 4.
Figure 6:
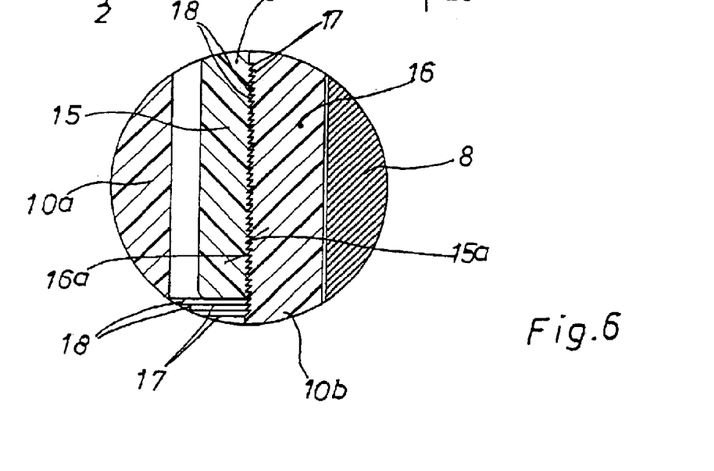
FIG. 6 is the enlarged detail VI from FIG. 5.

The second embodiment according to FIGS. 4 through 6 differs from the first embodiment according to FIGS. 1 through 3 only in that the two housing halves 9, 10 are provided with an annular ring 22, 23 each at their ends and are sealed against the sleeve 2 by means of an entropy-elastic ring sleeve 24, 25 each extending over them. The ball-and-socket joint 1 is protected from penetrating dust and moisture as a result.

Both housing halves 9, 10 are advantageously made from a wear- and heat-resistant plastic, such as polyether amide, polyamide, polyoxymethylene or polyether ether ketone according to the injection molding method.

Figure 7:
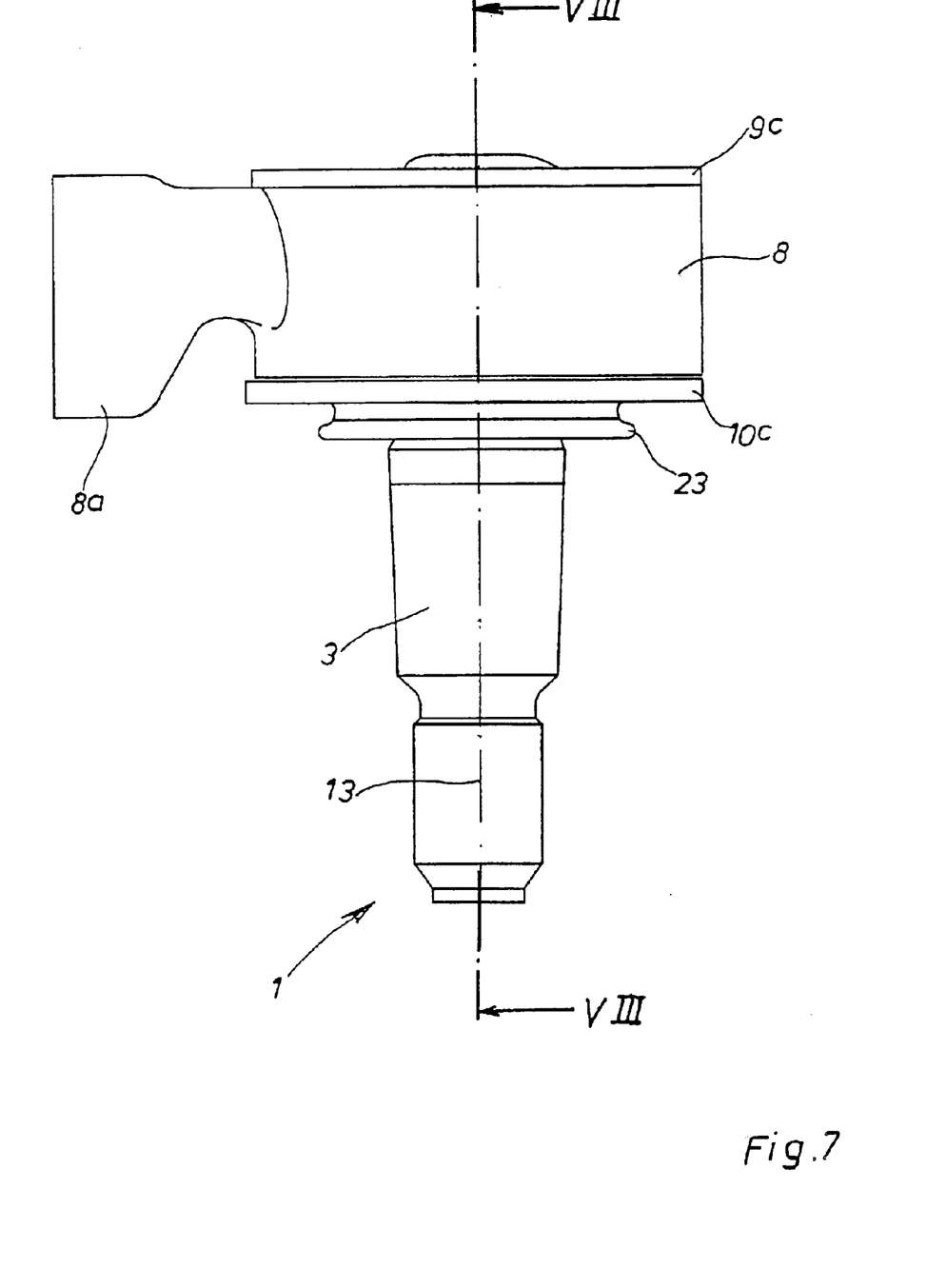
FIG. 7 is a view of a third embodiment of a ball-and-socket joint in conjunction with a pivot.
Figure 8:
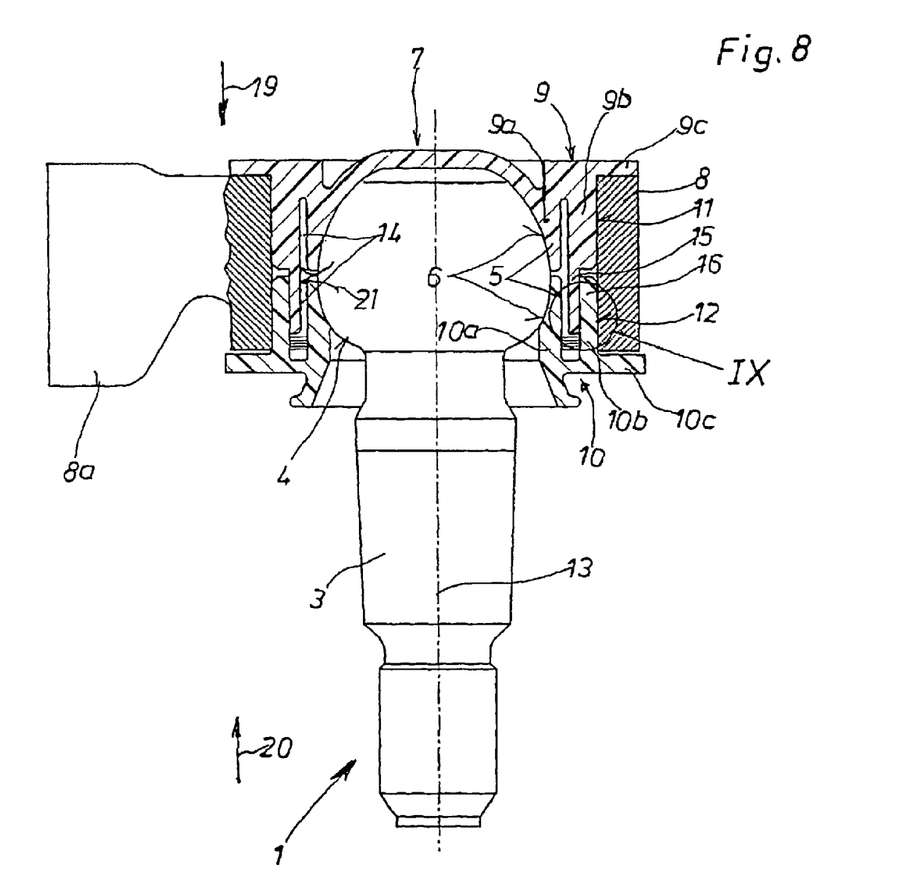
FIG. 8 is a sectional view along line VIII—VIII in FIG. 7.
Figure 9:
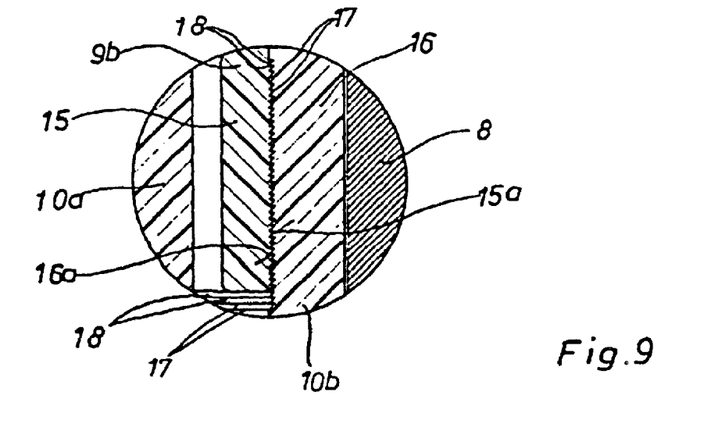
FIG. 9 is an enlarged detail IX from FIG. 8.

FIGS. 7 through 9 show a third embodiment of a ball-and-socket joint 1, which differs from the two above-described embodiments in that the ring element 8 belongs to a component 8a that is coupled via the ball-and-socket joint 1 with a second component, which is to be connected to the pivot 3 and is not shown. The pivot 3 is likewise provided with the partial spherical surface 4, which is surrounded by the correspondingly shaped, hollow spherical bearing surfaces 6 of the bearings 5 integrated within the housing inner parts 9a, 10a. Parts of the above-described embodiments that have the same function are also designated with the same reference numbers.

Figure 10:
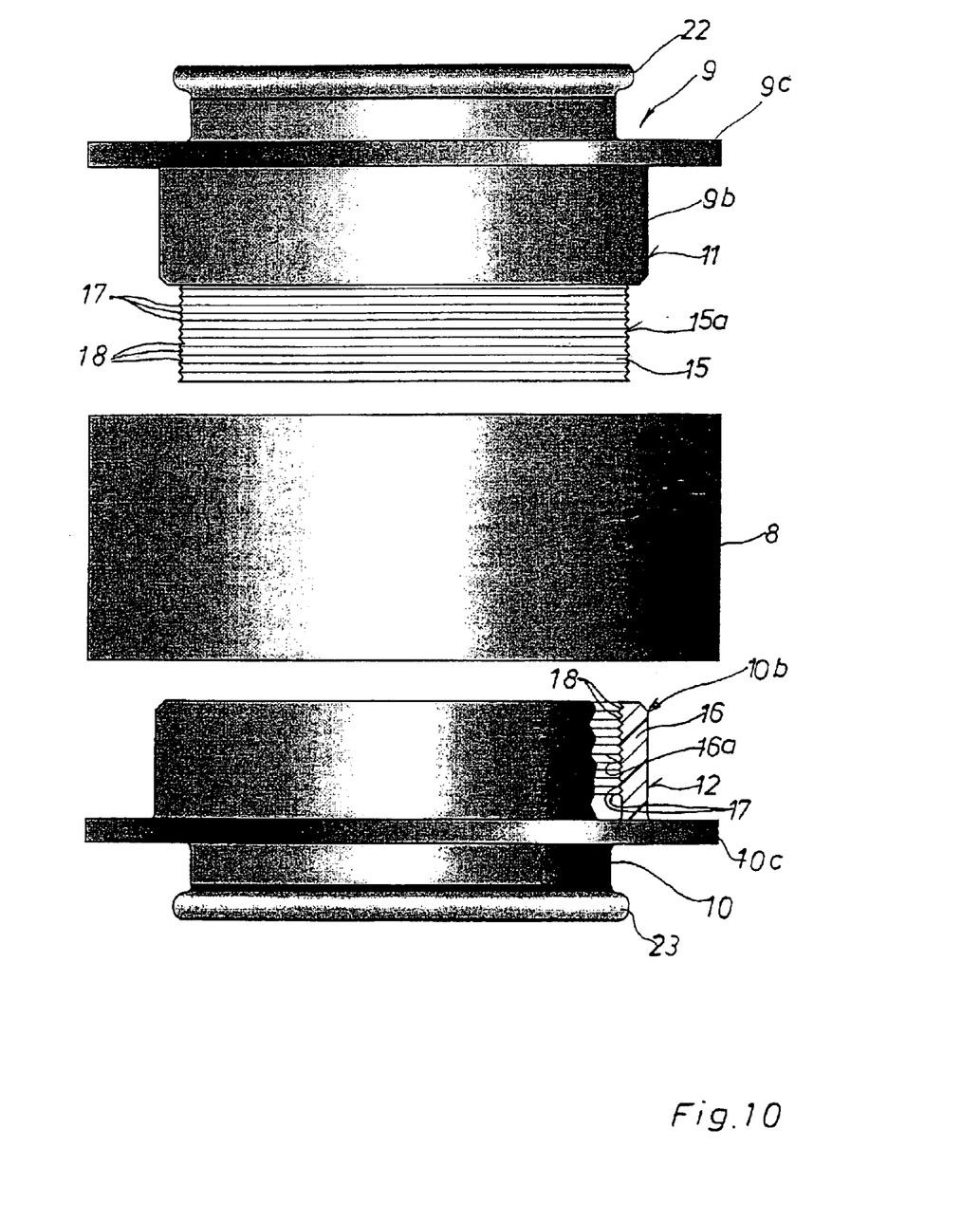
FIG. 10 is a perspective exploded view of the two housing halves with the ring element without sleeve and pivot.

FIG. 10 shows the exploded views of the housing half 9 and of the housing halve 10 with their housing outer parts 9b, 10b, as well as of the ring flanges 9c, 10c. The cylindrical locking elements 15, 16 with their barb-like detents 17 and with the locking grooves 18 located between them can be clearly recognized. The annular rings 22, 23 correspond to the above-described embodiments.

While specific embodiments of the invention have been shown and described in detail to illustrate the application of the principles of the invention, it will be understood that the invention may be embodied otherwise without departing from such principles.

What is claimed is:

1. A ball-and-socket joint, comprising:
   a sleeve or a pivot with a partial spherical surface;
   a two-part housing with housing halves having housing outer parts with cylindrical locking elements each with alternating detents and locking grooves mutually engaging each other to lock the two housing halves in a direction of a longitudinal axis of the sleeve or of the pivot immovably in relation to one another in a final assembled position, the two-part housing including housing inner parts with a hollow spherical bearing surface portion surrounding the partial spherical surface and connecting said sleeve or pivot to said two part housing in a positive-locking manner with said hollow spherical bearing surface for the partial spherical surface of the sleeve or of the pivot integrated within inner surfaces of said two housing halves.

2. A ball-and-socket joint in accordance with claim 1, further comprising a ring element, wherein said ring element extends over outer surfaces of said housing halves in a positive-locking manner.

3. A ball-and-socket joint in accordance with claim 2, wherein said ring element is part of a first component coupled via ball-and-socket joint with a second component that is connected to one of said sleeve and said pivot.

4. A ball-and-socket joint in accordance with claim 2, wherein a gap extending approximately in parallel to said longitudinal symmetry axis of said sleeve or of said pivot is provided between said housing inner parts containing said bearing surfaces and said housing outer parts of said two housing halves, which said housing outer surfaces have contact surfaces for said ring element.

5. A ball-and-socket joint in accordance with claim 1, wherein said housing inner parts are in contact by said bearing surface with said partial spherical surface of said sleeve or of said pivot under spring pretension.

6. A ball-and-socket joint in accordance with claim 5, wherein the amount of spring pretension is controlled by displacement as a function of a snap-in depth of said locking elements or is controlled by force according to the force with which said two housing halves are pressed together.

7. A ball-and-socket joint in accordance with claim 1, wherein said housing outer parts of said two housing halves extend over each other with said cylindrical locking elements of which one of said cylindrical locking elements of one said housing half faces a ball head and is provided alternatingly with detents and locking grooves on a partial cylindrical outer surface, and said cylindrical inner surface of said cylindrical locking element of said other housing half extending over same is provided with corresponding locking grooves and detents which act as barbs to engage each other.

8. A ball-and-socket joint in accordance with claim 1, wherein both said housing halves are provided with an annular ring each at ends and sealed against said sleeve or said pivot by means of an entropy-elastic ring sleeve extending over said annular ring.

9. A ball-and-socket joint in accordance with claim 1, wherein said housing halves are made of a wear-resistant and heat-resistant plastic including one or more of polyether imide, polyamide, polyoxymethylene and polyether ether ketone.

10. A ball-and-socket joint in accordance with claim 1, in combination with a rocker pendulum, on a tie rod or on a transversal swinging arm of a motor vehicle.

11. A ball-and-socket joint in accordance with claim 8, wherein said ring sleeves are connected to said housing halves.

12. A ball-and-socket joint, comprising:
    an element with a partial spherical surface;
    a first housing part with a locking element with alternating annular detents and annular locking grooves provided successively in a housing longitudinal axis direction; and
    a second housing part with a locking element with alternating annular detents and annular locking grooves provided successively in the housing longitudinal axis direction, said first locking element and said second locking element mutually engaging each other to form a connected first housing part and second housing part and to immovably lock said first housing part and said second housing part in the housing longitudinal axis direction with said partial spherical surface in said connected first housing part and second housing part in a final assembled position, said first housing part having an integral bearing surface in contact with said partial spherical surface and said second housing part having an integral bearing surface in contact with said partial spherical surface.

13. A ball-and-socket joint in accordance with claim 12, further comprising a ring element, wherein said ring element extends over outer surfaces of said first housing part and said second housing part in a positive-locking manner.

14. A ball-and-socket joint in accordance with claim 13, wherein said ring element is part of a first component coupled via ball-and-socket joint with a second component that is connected to one of said sleeve and said pivot.

15. A ball-and-socket joint in accordance with claim 4, wherein said gap is provided between said housing inner parts containing said bearing surfaces and said housing outer parts of each of said two housing halves.

16. A ball-and-socket joint in accordance with claim 15, wherein said housing outer parts of said two housing halves extend over each other with some of said alternating detents and locking grooves of one said cylindrical locking elements arranged in said gap.

17. A ball-and-socket joint in accordance with claim 1, wherein said hollow spherical surface is in direct contact with said partial spherical surface.

18. A ball-and-socket joint in accordance with claim 1, wherein said cylindrical locking elements cooperate to form a snap connection.

19. A ball-and-socket joint in accordance with claim 1, further comprising a ring element, wherein said ring element extends over outer surfaces of said housing halves in a positive-locking manner and wherein each of said housing halves has a ring flange in contact with a respective lateral surface of said ring element.

20. A ball-and-socket joint, comprising:

an element with a partial spherical surface;

an integral first housing part with a first partial spherical bearing surface portion and a first resilient locking element portion, said locking element portion having alternating annular detents and annular locking grooves provided successively in a housing longitudinal axis direction; and an integral second housing part with a second partial spherical bearing surface portion and a second resilient locking element with alternating annular detents and annular locking grooves provided successively in the housing longitudinal axis direction, detents of said first locking element engaging grooves of said second locking element to form a connected first housing part and second housing part with said first partial spherical bearing surface portion in contact with said partial spherical surface and said second partial spherical bearing surface portion in contact with said partial spherical surface and retaining said partial spherical surface in said housing and with an annular gap extending between said first partial spherical bearing surface portion and said first locking element portion and with the annular gap extending between said second partial spherical bearing surface portion and said second locking element portion.

* * * * *